(12) United States Patent
Shave

(10) Patent No.: US 6,174,015 B1
(45) Date of Patent: Jan. 16, 2001

(54) VEHICLE TAILGATE

(75) Inventor: Bryan Leslie Shave, Kingston Bagpuize (GB)

(73) Assignee: Rover Group Limited, Warwick (GB)

( * ) Notice: Under 35 U.S.C. 154(b), the term of this patent shall be extended for 0 days.

(21) Appl. No.: 09/331,752

(22) PCT Filed: Jan. 12, 1998

(86) PCT No.: PCT/GB98/00011

§ 371 Date: Jun. 24, 1999

§ 102(e) Date: Jun. 24, 1999

(87) PCT Pub. No.: WO98/30407

PCT Pub. Date: Jul. 16, 1998

(30) Foreign Application Priority Data

Jan. 14, 1997 (GB) .................................................. 9700611

(51) Int. Cl.[7] .................................................. B62D 25/10
(52) U.S. Cl. .................................. 296/56; 296/55; 296/76
(58) Field of Search .................................. 296/55, 56, 76, 296/51, 146.12, 146.13; 292/DIG. 43; 16/319, 343, 347, 348, 317

(56) References Cited

U.S. PATENT DOCUMENTS

| 4,413,854 | 11/1983 | Hirshberg . |
| 4,664,437 | 5/1987 | Queveau . |
| 4,688,844 | 8/1987 | Hirose et al. . |
| 4,722,206 | 2/1988 | Nakamura et al. . |
| 6,068,327 | * 5/2000 | Junginger ............................ 296/56 X |
| 6,089,640 | * 7/2000 | Cart ........................................ 296/56 |

FOREIGN PATENT DOCUMENTS

| 93 10 058 | 9/1993 | (DE) . |
| 44 00 374 | 7/1995 | (DE) . |
| 0 718 134 | 6/1996 | (EP) . |

OTHER PUBLICATIONS

Patent Abstracts of Japan, vol. 013, No. 237 (M–833), Jun. 5, 1989 & JP 01 047617 A (OI Seisakusho Co Ltd), Feb. 22, 1989, see abstract.

* cited by examiner

Primary Examiner—D. Glenn Dayoan
Assistant Examiner—Jason Morrow
(74) Attorney, Agent, or Firm—Davis and Bujold

(57) ABSTRACT

A vehicle tailgate comprises an upper section (18) and a lower section (24) which are joined by hinges (26). The hinges (26) include securing parts which lock behind latch pins (58) on the vehicle body, but are released from them when the lower section (24) is raised to an open position. This enables the two sections (18, 24) to be raised together.

20 Claims, 7 Drawing Sheets

VEHICLE TAILGATE

The present invention relates to vehicle tailgates, and in particular to tailgate assemblies which can be opened in different ways to allow full or limited access to the rear of the vehicle.

It is known from U.S. Pat. No. 4,413.854 and U.S. Pat. No. 4.688.844 to provide a vehicle tailgate in which a rear section can be opened like the boot lid of a saloon car, but which can alternatively be opened fully like a conventional hatchback tailgate. However, these arrangements are somewhat cumbersome to operate and require unique locks.

The present invention provides a vehicle tailgate assembly comprising an upper tailgate section and a lower tailgate section. upper hinge means for pivotably attaching the upper tailgate section to a vehicle body, lower hinge means for pivotably attaching the lower tailgate section to the upper tailgate section, and releasable securing means for securing the upper tailgate section in a closed position relative to the vehicle body, the releasable securing means being arranged to be released by movement of the lower tailgate section into an open position characterised in that the assembly further comprises locking means arranged to lock the lower tailgate section in an open position relative to the upper tailgate section whilst the upper tailgate section is raised.

Figure 1:
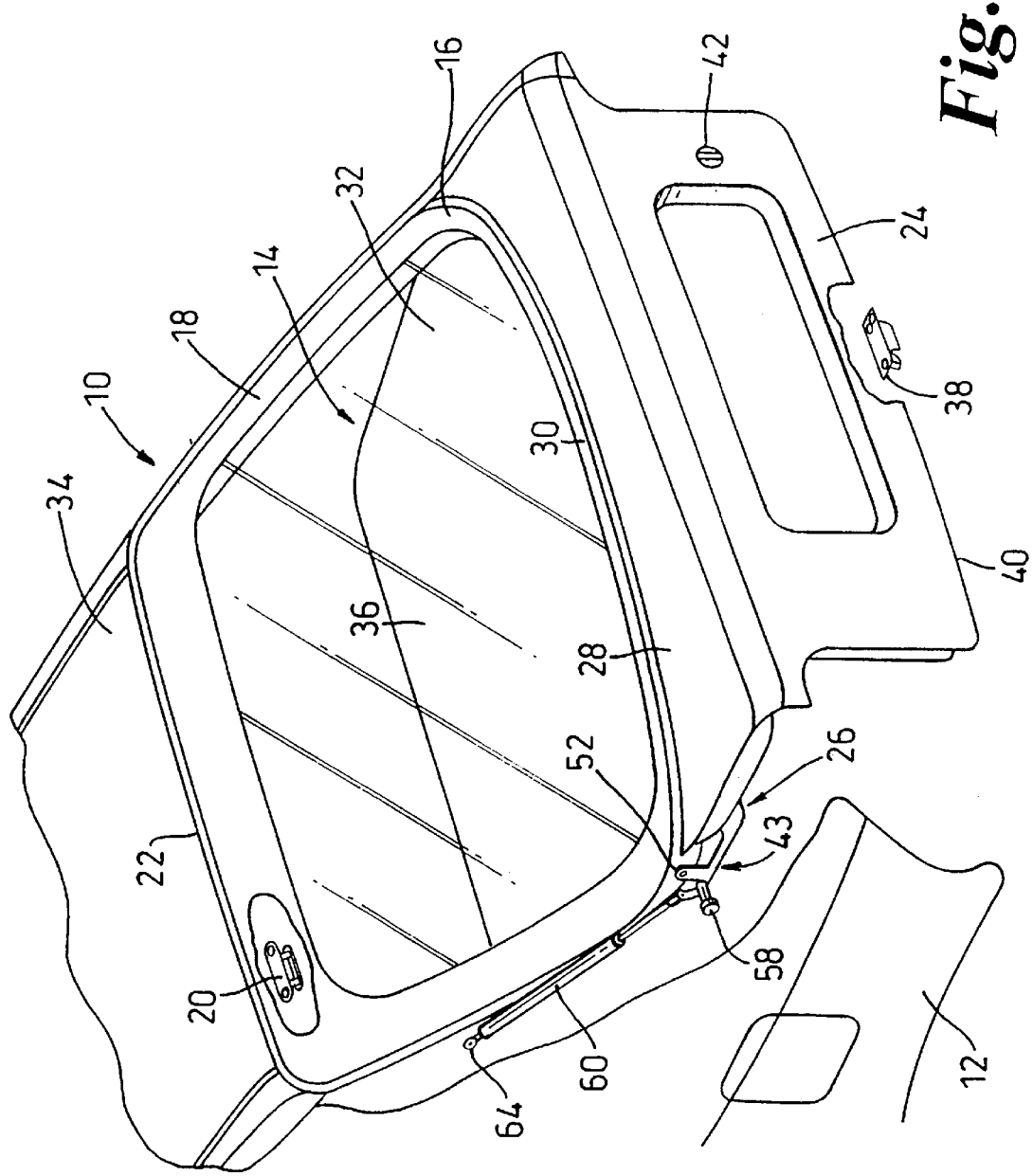
Figure 2:
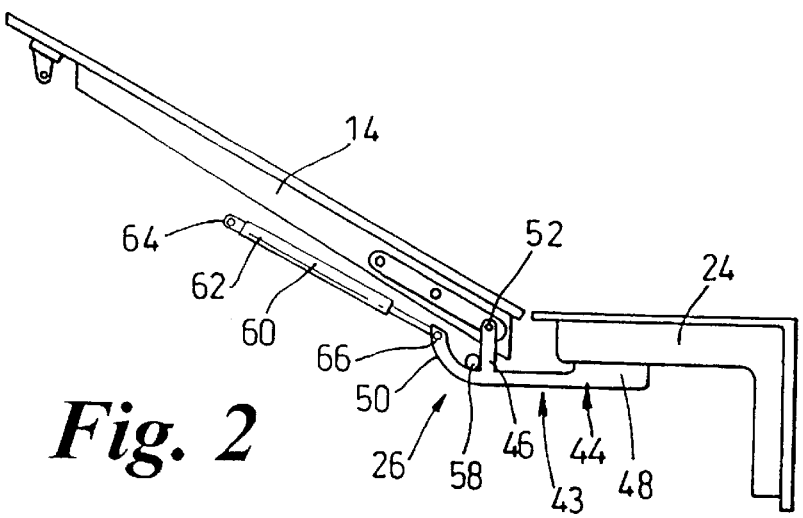
Figure 3:
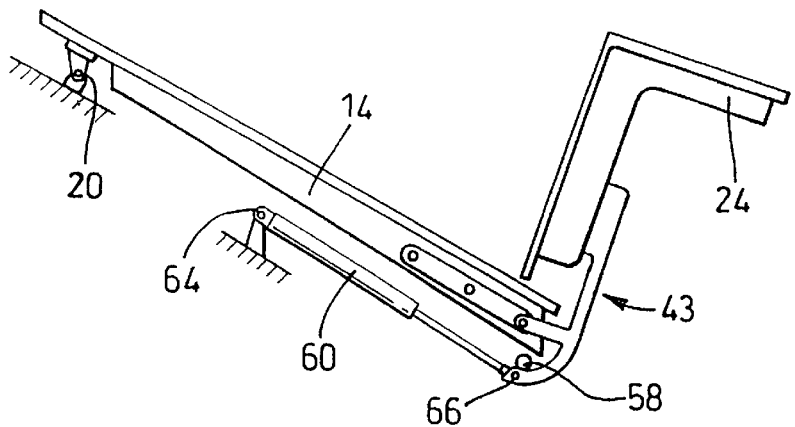
Figure 4:
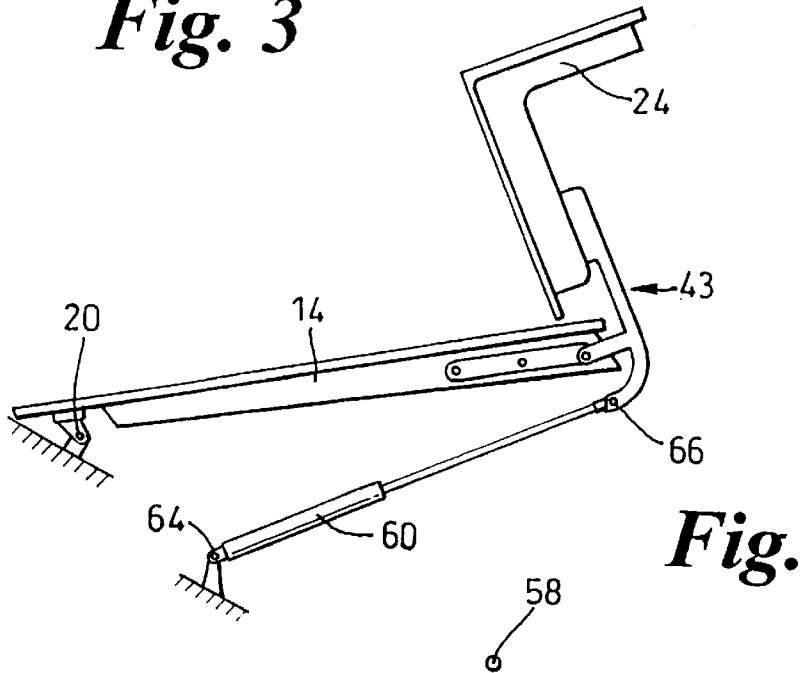
Figure 5:
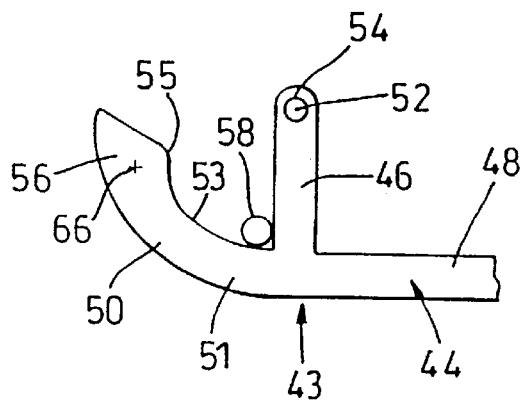
Figure 6:
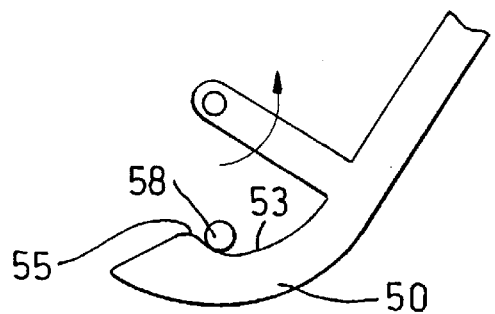
Figure 7:
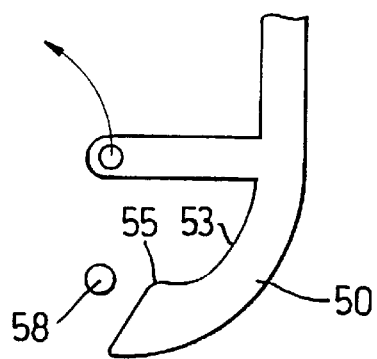

Preferred embodiments of the present invention will now be described with reference to the accompanying drawings in which:

FIG. 1 is a perspective view of a vehicle including a tailgate assembly according to a first embodiment of the present invention, FIG. 2 is a section through the tailgate assembly of FIG. 1 in a closed position, FIG. 3 is a section through the tailgate assembly of FIG. 1 in a partially open position, FIG. 4 is a section through the tailgate assembly of FIG. 1 in a fully open position, FIG. 5 is a detailed section through a part of the assembly of FIG. 1 in a fully closed position, FIG. 6 is a section corresponding to FIG. 5 with the same part of the assembly in a near-open position, FIG. 7 is a section corresponding to FIG. 5 with the same part of the assembly in an open position, FIGS. 8 to 11 are side views of part of a tailgate assembly according to a second embodiment of the invention in various positions.

Referring to FIG. 1, a vehicle 10 has a body 12 with an opening 14 at its rear end. A tailgate assembly 16 includes an upper section 18 attached by hinges 20 to the vehicle body at its upper foremost edge 22, and a lower section 24 attached by two hinges 26 at its foremost edge 28 to the lower rearmost edge 30 of the upper section. The upper section 18 includes the rear windscreen 32 of the vehicle and, when in its closed position, covers the upper part of the opening 14 between the roof 34 of the vehicle and a parcel shelf 36. The lower section 24, when in its closed position cover the lower part of the opening 14 beneath the parcel shelf 36. A conventional latch 38 is provided at the lower edge 40 of the lower section 24 for securing the tailgate in a closed position, and is operated by turning a key in a lock barrel 42 in the lower section 24.

The hinges 26 are mounted one on either side of the tailgate assembly 16. As can be seen in FIGS. 2, 3 and 4, each of the hinges 26 comprises a hinge member 43 having an L-shaped hinge portion 44 with a shorter arm 46 and a longer arm 48 joined to each other at right angles, and a securing portion in the form of a curved claw 50 having its base 51 attached to the angle of the hinge portion. The shorter arm 46 has a pivot point 52 at its free end where it is pivotably attached to the upper section 18 of the tailgate by means of a pin 54. The longer arm 48 is rigidly attached to the lower section 24 of the tailgate. T he curved claw 50 is shaped such that its inner edge 53, over most of its length, follows an arc centred on the pivot point 52. At the free end 56 of the claw, the inner edge 53 has a projection on it which acts as a check stop 55 as described below. When the tailgate is closed, the hinge member 43 is arranged such that the longer arm 48 is horizontal and the shorter arm 46 extends upwards from its foremost end. At each side of the vehicle, a latch pin 58 is mounted on the vehicle body 12 which extends horizontally and engages with the inner edge 53 of the claw 50 to secure the upper section 18 of the tailgate in the closed position. Also on each side of the vehicle, a gas strut 60 is provided which has one end 62 pivotably attached to the vehicle body 12 at a first strut pivot point 64 by the side of the opening 14, and the other end attached to the hinge member 43 at a second strut pivot point 66 at the free end 56 of the securing claw 50.

Referring to FIGS. 2 and 5, when the tailgate assembly 16 is in its closed position, the securing claw 50 is engaged behind the latch pin 58, with the latch pin 58 in the corner between the base 51 of the claw 50 and the shorter arm 46 of the hinge portion 44. The claw 50 is therefore held down by the latch pin 58, preventing the upper section 18 of the tailgate from being lifted. The lower tailgate section 24 is secured in the closed position by the latch 38.

If the latch 38 is released, the lower tailgate section 24 can be raised to the near-open position shown in FIGS. 3 and 6. During this operation, the hinge members 43 rotate about their pivot points 52, and the inner surfaces 53 of the claws 50 slide round the latch pins 58. When the check stop 55 reaches the latch pin 58 it provides a resistance to further movement of the lower tailgate section 24, tending to bring it to a halt in the near-open position. In this position access can be gained to the luggage compartment of the vehicle beneath the parcel shelf 36, but the upper tailgate section 18 remains closed, protecting the passenger compartment from the environment. Because, for each gas strut 60, the second gas strut pivot point 66 is below the straight line joining the first gas strut pivot point 64 and the hinge pivot point 52, the gas struts, which are under compression, urge the lower tailgate section towards the near open position, and can support it there unaided. However, they are not sufficiently strong to overcome the resistance of the check stops 55. This means that the lower tailgate section 24 can be opened and closed much like a conventional boot lid of a saloon car.

If the whole tailgate assembly 16 is to be raised, the lower tailgate section 24 is pushed back to a fully open position shown in FIG. 7. This pulls the check stops 55 past the latch pins 58, releasing the hinge members 43 so that the upper tailgate section 18 can be raised, pivoting about the upper hinges 20. As can be seen best in FIG. 4, during this operation, because the first gas strut pivot points 64 are below the straight lines between the hinges 20 and the second gas strut pivot points 66, the gas struts 60 which are still under compression tend to urge the upper tailgate section 18 upwards towards its fully open position. However, over at least the first part of the upward travel of the upper section 14, the strength of the gas struts is not sufficient to raise the upper section 14 unaided, so it tends towards its closed position. When the tailgate is in the fully open position, the gas struts 60 hold the upper tailgate section 18 in its uppermost position, and also hold the lower tailgate section 24 in its fully open position relative to the upper section 18.

To close the tailgate the procedure is the reverse of that for raising it. Firstly the upper tailgate section 14 is lowered until it rests against the vehicle body 12 as shown in FIG. 3. In this position it is held down by its own weight as described above. Then the lower tailgate section 24 is lowered, so that firstly the check stops 55 pass under the latch pins 58 securing the upper tailgate section in its closed position, and then the inner edges 53 of the securing claws 50 slide under the latch pins 58 until the lower section 24 is in its fully closed position, where it can be locked by means of the latch 38.

Referring to FIGS. 8 to 11, in a second embodiment of the invention a vehicle tailgate comprises a lower tailgate section (not shown) attached to an upper tailgate section 72 by means of a pair of hinge assemblies, only one of which is shown. Each hinge assembly comprises a hinge member 74 rigidly attached to the lower tailgate section and pivotably attached to the upper tailgate section at a pivot 76, a hook 78, shown in broken lines in FIG. 8, pivotably attached to the upper tailgate section 72 at a pivot 80, and a stop 82 , pivotably attached at one end to the upper tailgate section 72 at a pivot 84, and having a raised abutment 86 at the other end. The hook 78 has a raised portion 98 formed on one side at its pivoted end which has a catchment slot 96 formed in it. The catchment slot extends from the end of the raised portion 98 furthest from the pivot 80 towards the pivot, and the part 98a of the raised portion forming the front side of the slot is shorter than that 98b forming the back.

Figure 8:
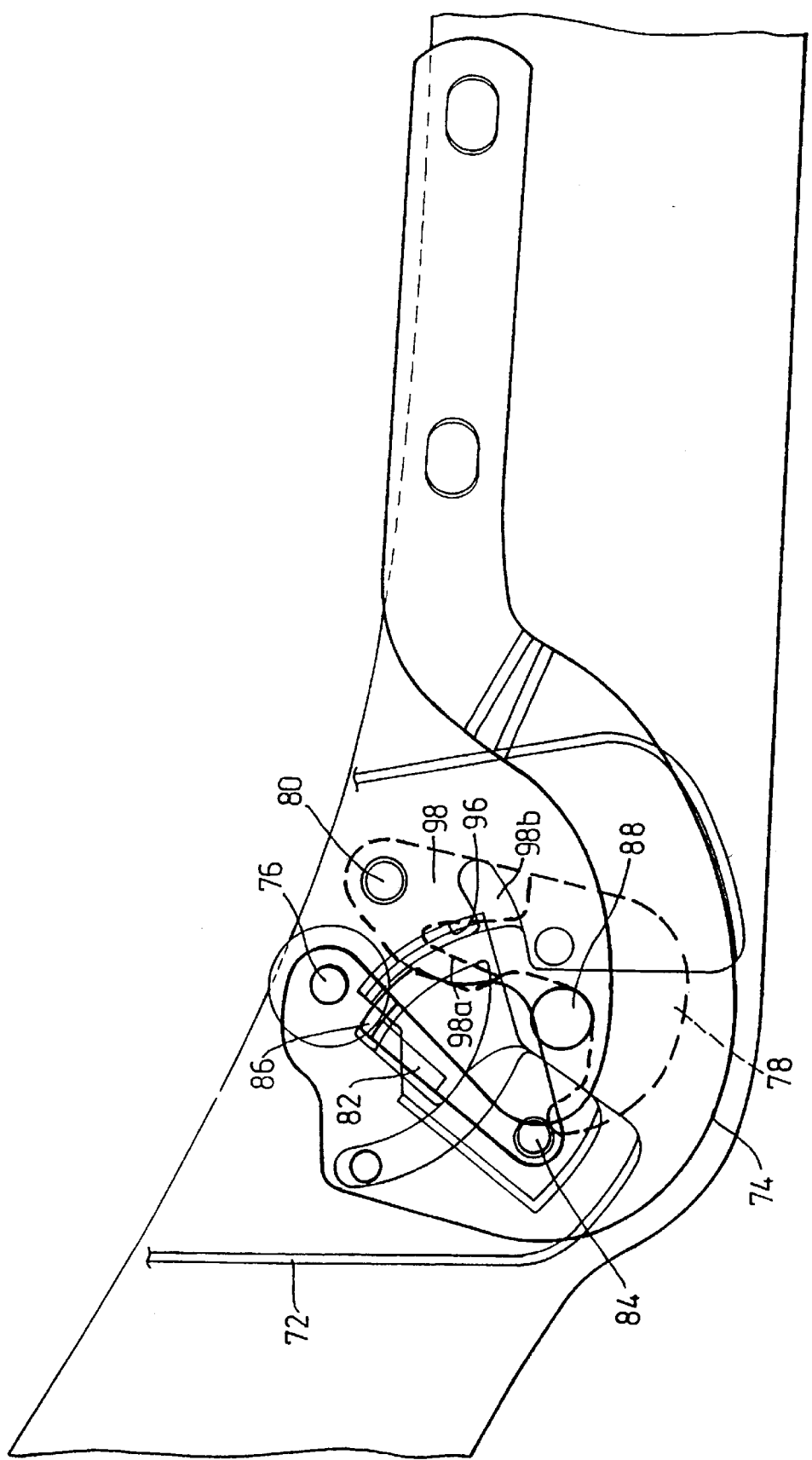

Referring to FIG. 8, when the tailgate is in the closed condition the hook 78 is engaged behind a latch pin 88 which is fixed to the vehicle body. This locks the upper tailgate section 72 in the closed position. The lower tailgate is locked at its rear edge in the usual way.

Figure 9:
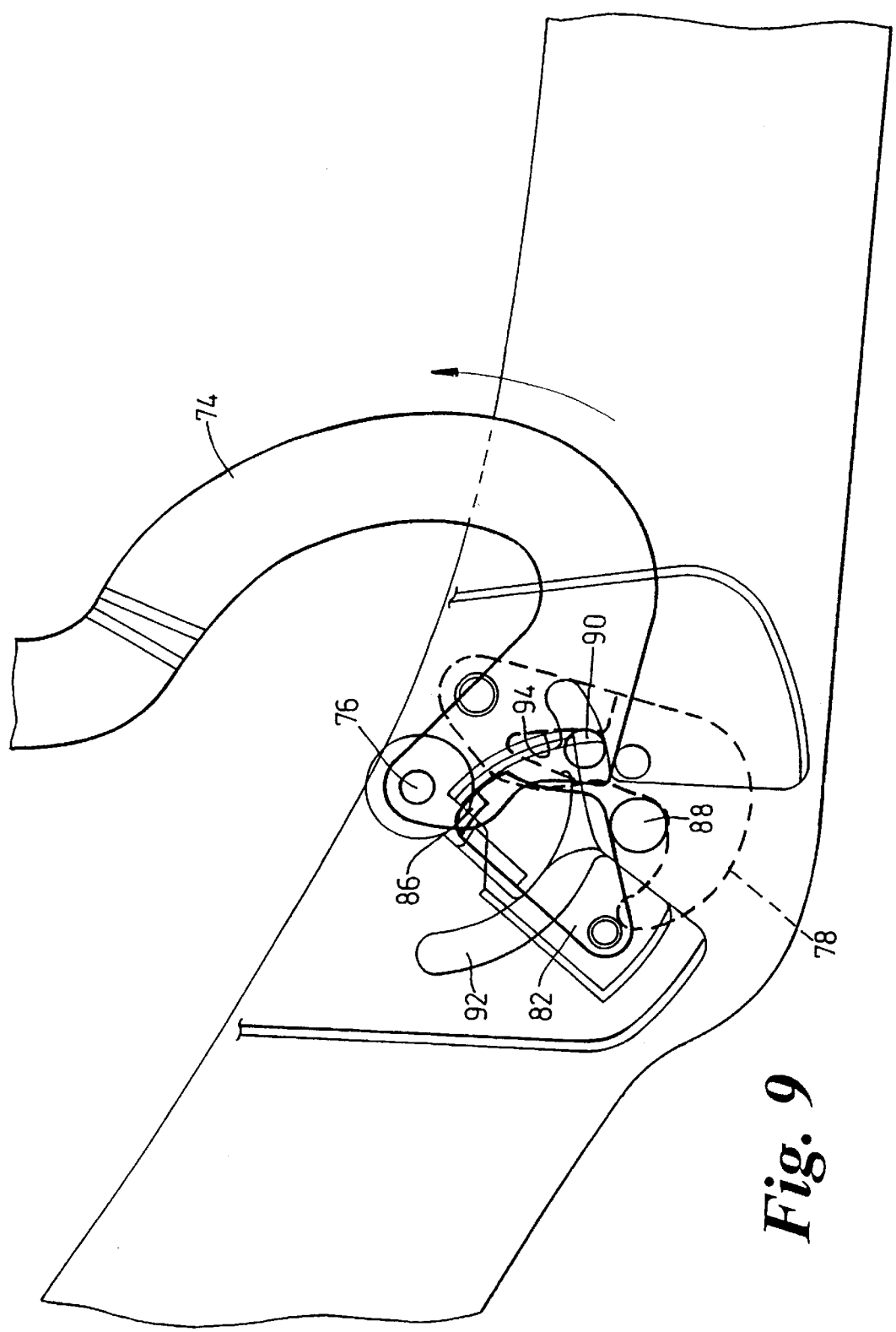

Referring to FIG. 9, when the lower tailgate section is raised the hinge 74 rotates upwards about its pivot 76, and a release pin 90 which is attached to it runs along an arcuate slot 92 formed in the upper tailgate section 72 until it pass the end of the slot 96 and engages with its back edge 94. Further lifting of the lower tailgate section 74 causes the hook to be rotated out of engagement with the latch pin 88 towards the position shown in FIG. 10, thereby releasing the upper tailgate section 72, and the release pin 90 to run up the slot 96 rotating the hook 78 further.

Figure 10:
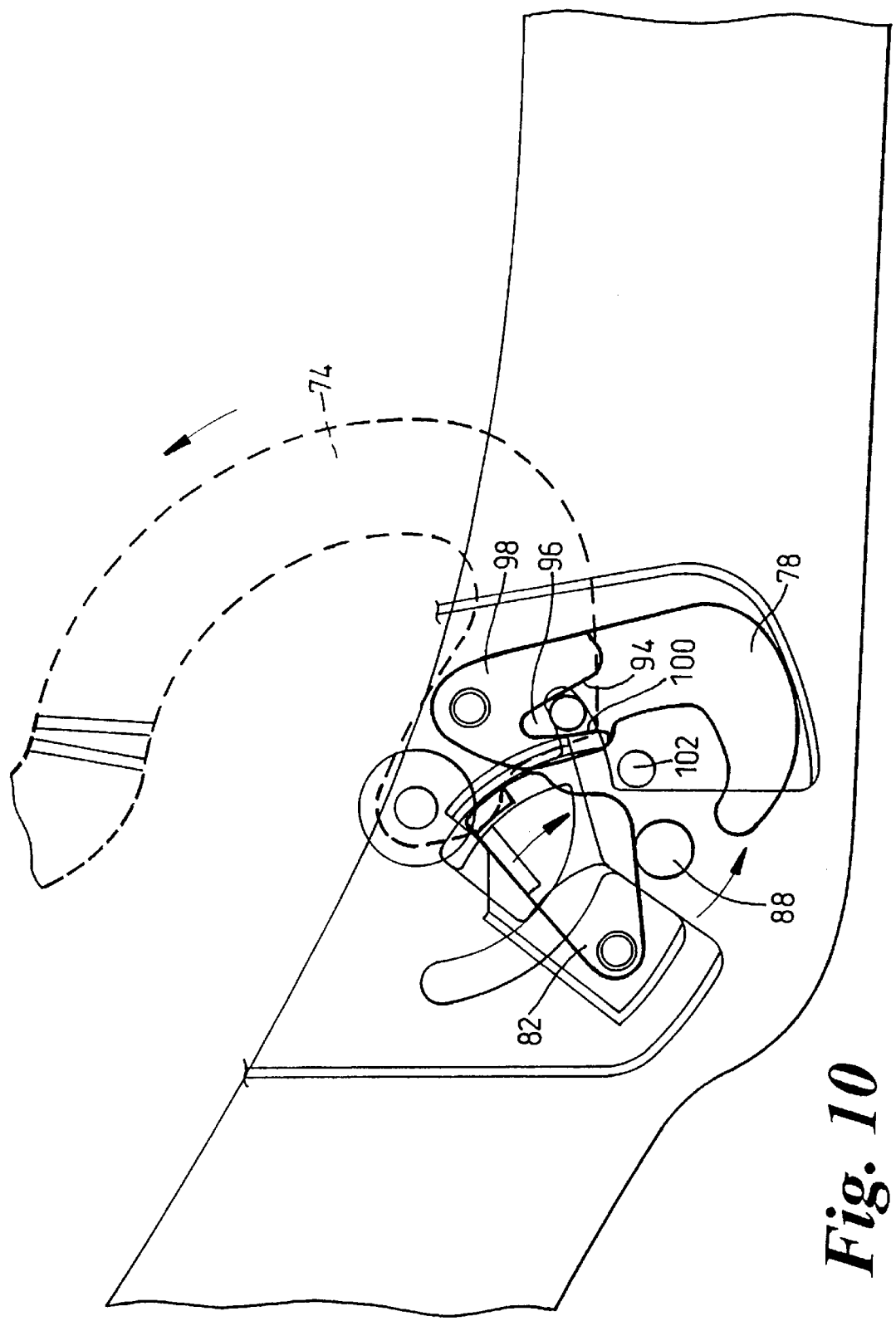
Figure 11:
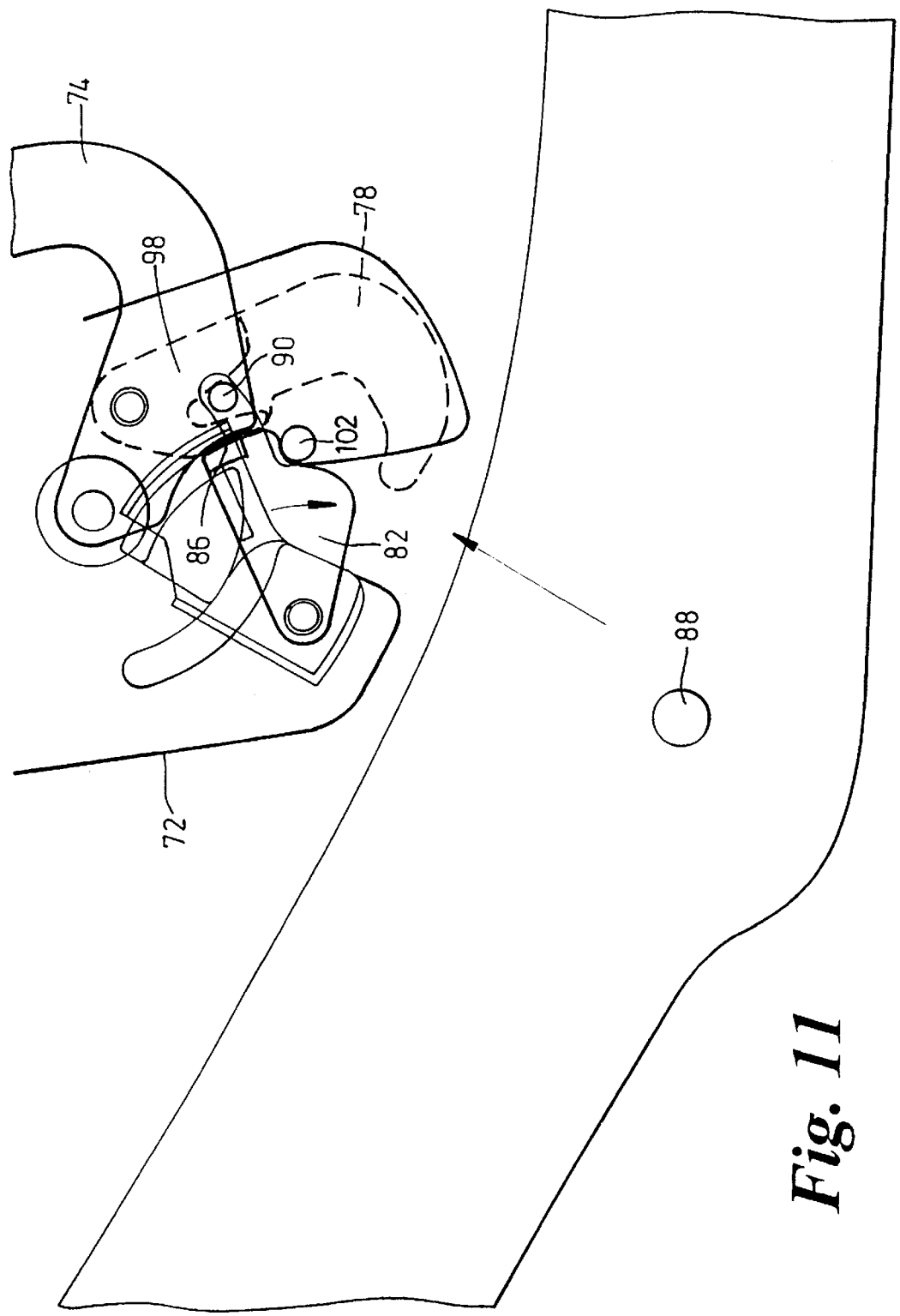

Referring now to FIG. 10, as the upper tailgate section is raised about the hinges at its upper end, the stop 82 is lifted clear of the latch pin 88 and is urged downwards by a spring, not shown, until it engages with another pin 102 mounted on the upper tailgate section. In this position, which is illustrated in FIG. 11, the abutment 86 on the stop engages with the raised portion 98 on the hook 78 preventing it from rotating back to its original position, and because the release pin 90 on the hinge is captured in the slot 96 on the hook, the hinge 74 and lower tailgate section are locked in the raised position relative to the upper tailgate section 72. This locked condition is maintained until the upper tailgate section 72 is fully lowered again which causes the latch pin 88 on the vehicle body to push the stop 82 upwards thereby releasing the hook 78. The lower tailgate section can then be lowered, the first part of its travel rotating the hook 78 by means of the release pin 90 on the hinge 74 engaged in the slot 96 on the hook, thereby locking the upper tailgate section 72 in the closed position.

As with the first embodiment, gas struts (not shown) are attached between the vehicle body and the lower tailgate section so that they urge the lower tailgate section towards its raised, open position when the upper tailgate section 72 is closed, and urge the upper tailgate section towards its raised, open position when the hook 78 is released.

What is claimed is:

1. A vehicle tailgate assembly comprising an upper tailgate section and a lower tailgate section, upper hinge means for pivotably attaching the upper tailgate section to a vehicle body, lower hinge means for pivotably attaching the lower tailgate section to the upper tailgate section, and releasable securing means for securing the upper tailgate section in a closed position relative to the vehicle body, the releasable securing means being arranged to be released by movement of the lower tailgate section into an open position characterized in that the assembly further comprises locking means arranged to lock the lower tailgate section in an open position relative to the upper tailgate section whilst the upper tailgate section is raised.

2. An assembly according to claim 1, wherein the securing means comprises a securing part which is arranged to engage with a securing member on the vehicle body when the lower tailgate section is in a closed position and to disengage with the securing member when the lower tailgate section is moved into the open position.

3. An assembly according to claim 1, wherein the securing means comprises a securing part which is arranged to enage with a securing member on the vehicle body when the lower tailgate section is in a closed position and to disengage with the securing member when the lower tailgate section is moved into the open position and the securing part is fixed relative to the lower tailgate section.

4. An assembly according to claim 1, wherein the securing means comprises a securing part which is arranged to engage with a securing member on the vehicle body when the lower tailgate section is in a closed position and to disengage with the securing member when the lower tailgate section is moved into the open position, the securing part being fixed relative to the lower tailgate section and the securing part being formed integrally with part of the lower hinge means.

5. An assembly according to claim 2, wherein the securing part has a curved edge arranged to move round the securing member as the lower tailgate section raised and lowered whilst remaining engaged with the securing member.

6. An assembly according to claim 3, wherein the securing part has a curved edge arranged to move round the securing member as the lower tailgate section raised and lowered whilst remaining engaged with the securing member.

7. An assembly according to claim 4, wherein the securing part has a curved edge arranged to move round the securing member as the lower tailgate section raised and lowered whilst remain engaged with the securing member.

8. An assembly according to claim 1, wherein the securing means comprises a securing member mounted on the upper tailgate section and movable relative to it to secure and release it.

9. An assembly according to claim 2, wherein the securing means comprises a securing member mounted on the upper tailgate section and movable relative to it to secure and release it.

10. An assembly according to claim 8, wherein the securing member is arranged to be engaged by a releasing means mounted on the lower tailgate section when the lower tailgate section is moved into its open position.

11. An assembly according to claim 9, wherein the securing member is arranged to be engaged by a releasing means mounted on the lower tailgate section when the lower tailgate is moved into its open position.

12. An assembly according to claim 1, wherein that the locking means is arranged to be released by movement of the upper tailgate section into a closed position.

13. An assembly according to claim 8, wherein the locking means is arranged to engage with the securing member to lock it in a released position whilst the upper tailgate section is raised.

14. An assembly according to claim 9, wherein the locking means is arranged to engage with the securing member to lock it in a released position whilst the upper tailgate section is raised.

15. An assembly according to claim 10, wherein the locking means is arranged to engage with the securing member to lock it in a released position whilst the upper tailgate section is raised.

16. An assembly according to claim 13, wherein that the securing member engages with the lower tailgate section thereby to lock it in its open position whilst the upper tailgate section is raised.

17. An assembly according to claim 14, wherein that the securing member engages with the lower tailgate section thereby to lock it in its open position whilst the upper tailgate section is raised.

18. An assembly according to claim 15, wherein that the securing member engages with the lower tailgate section thereby to lock it in its open position whilst the upper tailgate section is raised.

19. An assembly according to claim 1, wherein the securing part has a checking means thereon for checking movement of the lower tailgate section in a near-open position where the securing means is not released.

20. An assembly according to claim 1, further comprising biasing means arranged to act between the vehicle body and a point on the tailgate assembly which is in a fixed position relative to the lower tailgate section, so that, when the securing means is secured, the biasing means biases the lower tailgate towards its open position, and when the securing means is released, it biases the upper tailgate towards its open position.

* * * * *